(12) United States Patent
Colmenarez et al.

(10) Patent No.: US 7,034,866 B1
(45) Date of Patent: Apr. 25, 2006

(54) COMBINED DISPLAY-CAMERA FOR AN IMAGE PROCESSING SYSTEM

(75) Inventors: Antonio J. Colmenarez, Peekskill, NY (US); Mi-Suen Lee, Ossining, NY (US); Tomas Brodsky, Croton-on-Hudson, NY (US); Hugo J. Strubbe, Yorktown Heights, NY (US); Peter J. Janssen, Scarborough, NY (US); Michael D. Pashley, Cortlandt Manor, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 924 days.

(21) Appl. No.: 09/718,246

(22) Filed: Nov. 22, 2000

(51) Int. Cl.
*H04N 5/232* (2006.01)
*H04N 5/222* (2006.01)

(52) U.S. Cl. .............................. 348/211.12; 348/333.1; 348/14.07

(58) Field of Classification Search ........... 348/207.99, 348/333.1, 211.11, 211.12, 218.1, 14.16, 348/14.07, 14.01, 340; 359/443, 454, 460, 359/456, 453, 744; 250/208.1
See application file for complete search history.

(56) References Cited

U.S. PATENT DOCUMENTS

| | | | | |
|---|---|---|---|---|
| 4,400,725 A | * | 8/1983 | Tanigaki ................... | 348/14.16 |
| 5,159,445 A | | 10/1992 | Getlin et al. | |
| 5,282,027 A | * | 1/1994 | Tanigaki et al. ......... | 348/14.01 |
| 5,400,069 A | | 3/1995 | Braun et al. | |
| 5,432,333 A | * | 7/1995 | Rostoker et al. ......... | 250/208.1 |
| 5,610,390 A | * | 3/1997 | Miyano .................... | 250/208.1 |
| 5,666,155 A | | 9/1997 | Mersereau | |
| 5,801,758 A | * | 9/1998 | Heirich ..................... | 348/14.16 |
| 5,956,163 A | | 9/1999 | Clarke et al. | |
| 6,069,674 A | * | 5/2000 | Aomori et al. ............... | 345/81 |
| 6,137,535 A | * | 10/2000 | Meyers ..................... | 250/208.1 |
| 6,454,414 B1 | * | 9/2002 | Ting ......................... | 348/14.07 |
| 2002/0030768 A1 | * | 3/2002 | Wu .............................. | 349/106 |

FOREIGN PATENT DOCUMENTS

| | | |
|---|---|---|
| EP | 0358128 A2 | 3/1990 |
| EP | 0596558 B1 | 5/1994 |
| GB | 2273411 A | 6/1994 |
| JP | 04167690 A * | 6/1992 |

* cited by examiner

*Primary Examiner*—Aung Moe
(74) *Attorney, Agent, or Firm*—Larry Liberchuk

(57) ABSTRACT

An image processing system includes a combined display-camera having an array of interspersed display elements and camera elements, arranged substantially in a common plane of a flat panel or other display. Each of at least a subset of the camera elements has one or more imaging angles associated therewith, with the one or more imaging angles being selected to provide a desired imaging operation for the combined display-camera. The imaging angles of the camera elements can be selected to provide an imaging operation which approximates that of a lens-based single-camera system, a pin-hole camera system or other type of system. Each of the camera elements may include multiple image sensors, such that different imaging angles can be set for the different image sensors of a given camera element, and different perspectives of a scene can be generated in the image processing system.

13 Claims, 6 Drawing Sheets

COMBINED DISPLAY-CAMERA FOR AN IMAGE PROCESSING SYSTEM

FIELD OF THE INVENTION

The present invention relates generally to the field of image processing systems, and more particularly to a combined display and camera suitable for use in such systems.

BACKGROUND OF THE INVENTION

Many conventional image processing systems utilize a camera in conjunction with a video display. FIG. 1 shows an example of such an arrangement in the form of an image processing system 100 which includes a camera 102 and a separate display 104. The system 100 may be used in a video conferencing application or other suitable application in which the camera 102 generates an image of an on-site user 106 and the display 104 presents images of one or more remote users to the user 106.

A significant problem that can arise in the system 100 of FIG. 1 is that it is difficult to configure the camera 102 and display 104 such that it appears to both the on-site and remote users that they are making eye contact via the generated images. This eye contact problem is a result of misalignment between the optical axis of the camera 102 and a normal to the display 104. In the system 100, the camera 102 and display 104 are typically located as close together as possible in order to minimize this effect. However, in applications such as portable video conferencing units and human-machine interfaces, users often locate themselves very close to the display, such that the eye contact problem is accentuated.

U.S. Pat. No. 5,666,155 entitled "Eye Contact Video Telephony" discloses an approach for addressing the eye contact problem described above. In this approach, a video camera is located behind a display screen and generates images of a user looking at the screen. Displayed images are directed to the user via an array of lenses in the display screen, so as to create an illusion of eye contact. Unfortunately, this approach requires placement of a video camera at a particular distance behind the display screen, which can substantially increase the size of the system. In addition, such an approach is unable to avoid certain important types of image-related distortion, such as the so-called "fish eye" distortion which results in a single-camera system when a user is situated close to the display.

SUMMARY OF THE INVENTION

The present invention solves one or more of the above-noted problems of conventional image processing systems by providing a combined display-camera in which a number of individual camera elements are integrated with display elements of a display.

In accordance with one aspect of the invention, a combined display-camera for use in an image processing system includes an array of interspersed display elements and camera elements, the interspersed elements being arranged substantially in a common plane of a flat panel display or other type of display. Each of at least a subset of the camera elements has one or more imaging angles associated therewith, with the one or more imaging angles being selected to provide a desired imaging operation for the combined display-camera. The imaging angles of the camera elements can be selected to provide an imaging operation which approximates that of a lens-based single-camera system or of a pin-hole camera system. Each of the camera elements may include multiple image sensors, such that different imaging angles can be set for the different image sensors of a given camera element, and different perspectives of a scene can thereby be generated in the image processing system.

In accordance with another aspect of the invention, the above-noted imaging angles for a given one of the camera elements comprise a set of angles including a horizontal angle $$\alpha_x = \tan^{-1}\left(\frac{x}{d}\right)$$

and a vertical angle $$\alpha_y = \tan^{-1}\left(\frac{y}{d}\right),$$

where x and y denote the horizontal and vertical distances from the camera element to the optical axis of the combined display-camera, and d is the distance from an image plane of the combined display-camera to a desired virtual focus point of the combined display-camera.

Advantageously, the present invention solves the above-noted eye contact and "fish eye" distortion problems, and avoids the need for implementation of a camera adjacent to or behind a display. In addition, the combined display-camera of the present invention is suitable for use in a wide variety of image processing systems, including video-camera-based systems such as video conferencing systems, video surveillance and monitoring systems, and human-machine interfaces.

DETAILED DESCRIPTION OF THE INVENTION

Figure 1:
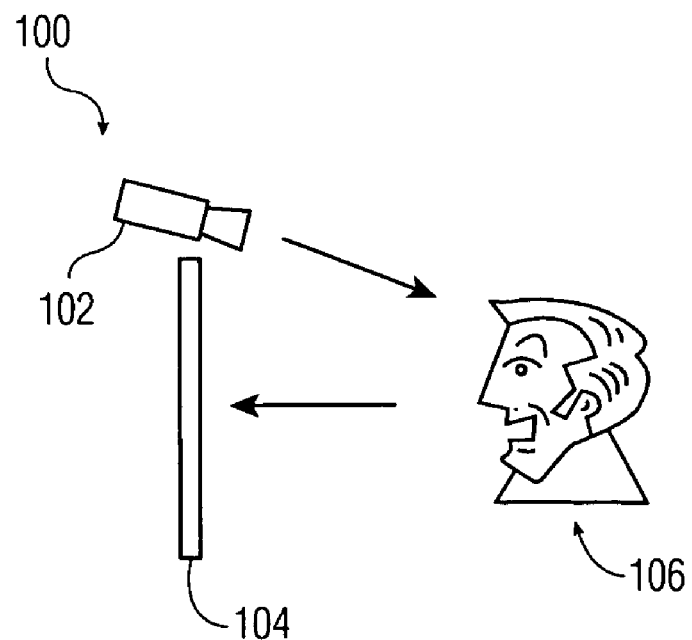
FIG. 1 is a simplified system diagram illustrating the configuration of a conventional image processing system including separate display and camera elements.
Figure 2:
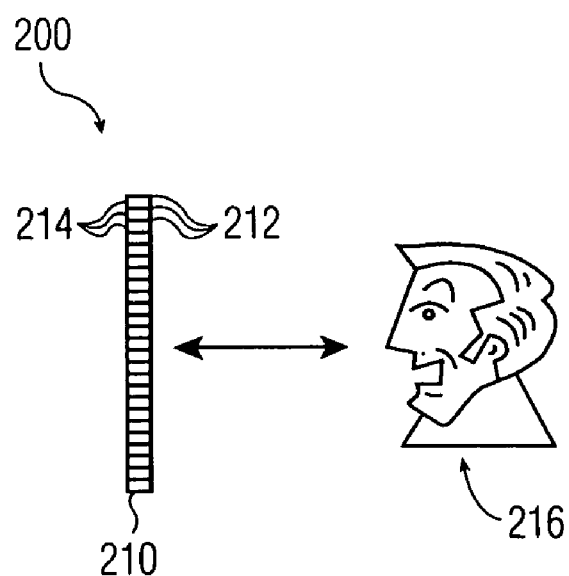
FIG. 2 is a simplified system diagram showing a combined display-camera in accordance with an illustrative embodiment of the present invention.

FIG. 2 shows a portion of an image processing system 200 in accordance with an illustrative embodiment of the present invention. The system 200 includes a combined display-camera 210 which is configured as an array of alternating display elements 212 and camera elements 214. Each of the display elements 212 may be a conventional display element such as a liquid crystal display (LCD) element, and may correspond to one or more image pixels. Each of the camera elements 214 may be a charge-coupled device (CCD), photosensor or other type of conventional image sensor, or a group of multiple such image sensors. In operation, the image sensing outputs of the set of camera elements 214 are combined using conventional image signal processing techniques so as to provide a desired composite image of a scene.

The camera elements 214 each preferably have a narrow field of view, and are interspersed with the display elements 212 substantially in a common plane so as to form a flat panel display. The combined display-camera 210 can thus provide the desired alignment between the camera optical axis and the display normal, as is illustrated in the figure. Although a user 216 may be constrained to a position in front of the display, such positioning is common and often preferred, particularly in portable video conferencing units and human-machine interfaces.

Figure 3A:
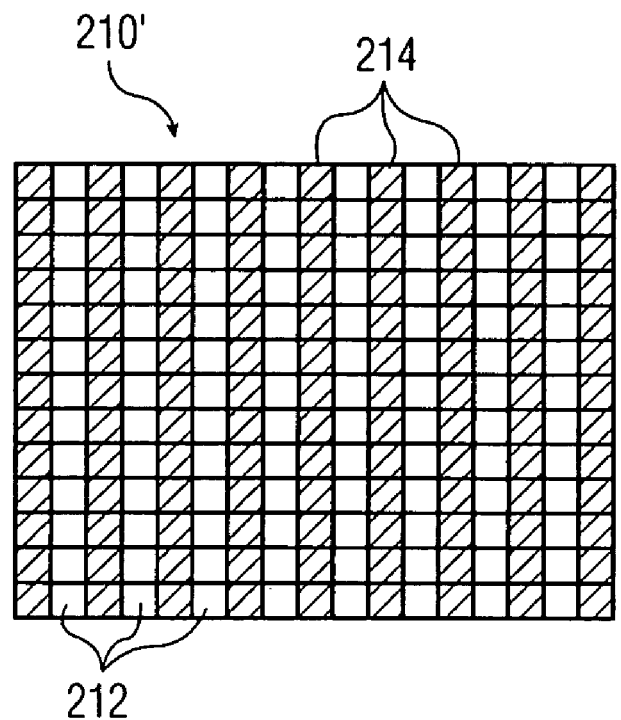
FIGS. 3(a) and 3(b) show examples of different possible arrangements of interspersed display elements and camera elements in a combined display-camera in accordance with the invention.
Figure 3B:
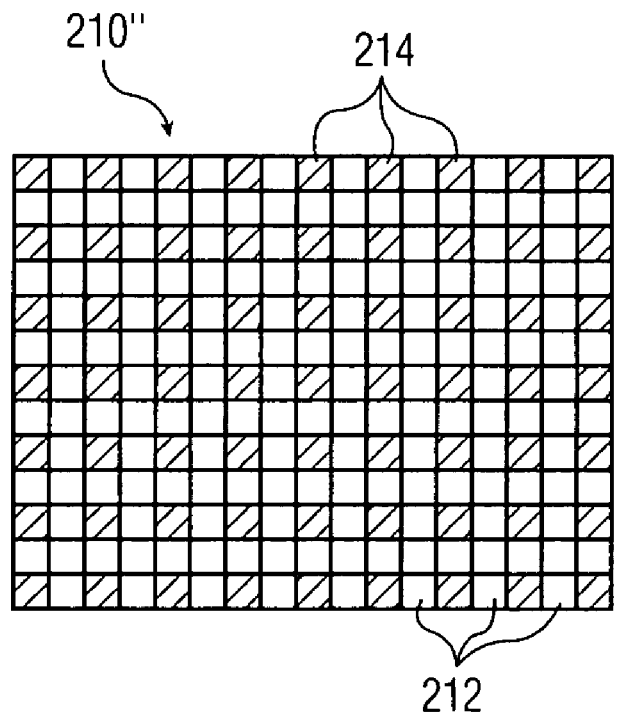

FIGS. 3(a) and 3(b) show examples of different possible arrangements of interspersed display elements 212 and camera elements 214 in a combined display-camera in accordance with the invention. These figures show the combined display-camera in the viewing direction of user 216 of FIG. 2. FIG. 3(a) shows a combined display-camera 210' in which there is a one-to-one relationship between the display elements 212 and the camera elements 214. FIG. 3(b) shows a combined display-camera 210" in which there is a three-to-one relationship between the display elements 212 and the camera elements 214. The arrangements of FIGS. 3(a) and 3(b) are shown by way of example only, and numerous alternative arrangements could also be used.

It will be appreciated by those skilled in the art that the combined display-cameras as shown in FIGS. 2, 3(a) and 3(b) will generally include additional elements such as support, housing and wiring elements. These elements are omitted from the figures for simplicity and clarity of illustration, and may be configured using any of a number of well-known conventional techniques.

The array of alternating display elements and camera elements in the combined display-camera of the present invention can be implemented in a number of different ways. For example, collimated plates having small holes which align with underlying photosensors may be used, the small holes being configured to allow collection of light from a user or object being imaged.

Figure 4:
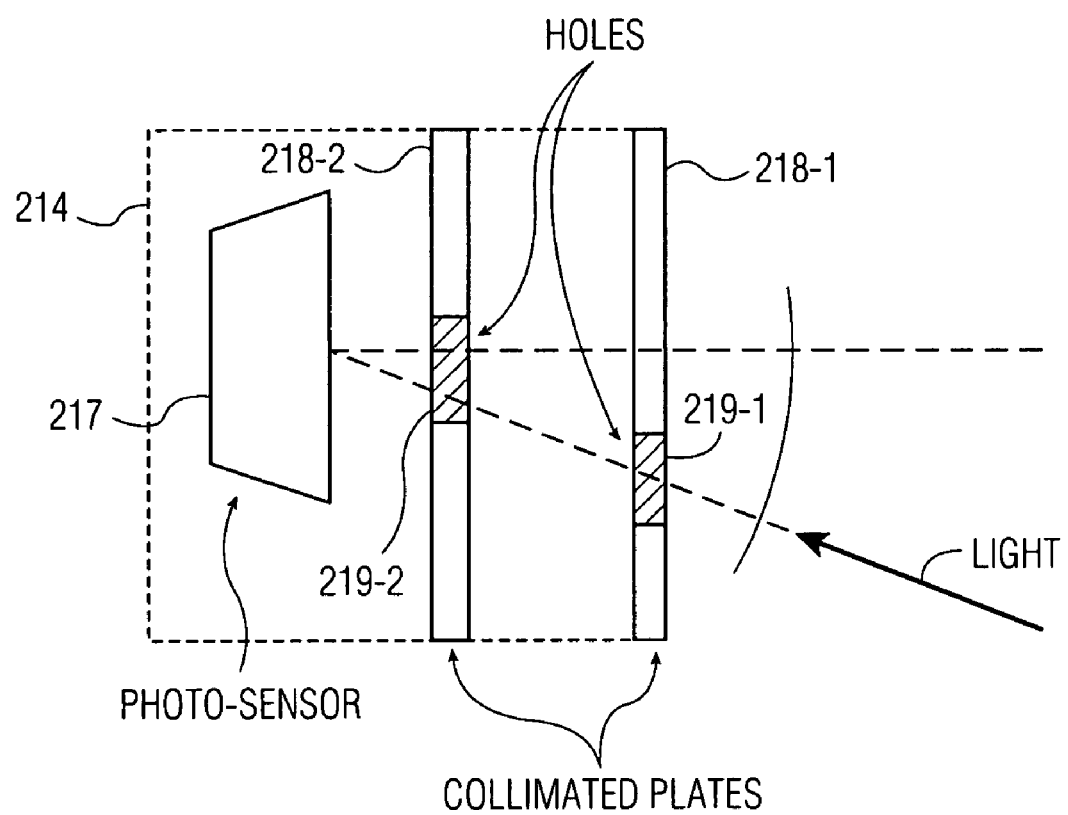
FIG. 4 shows one possible implementation of a camera element of a combined display-camera in accordance with the invention.

FIG. 4 illustrates a camera element 214 configured in the manner described above. The camera element 214 includes a photosensor 217 and portions of a pair of collimated plates 218-1 and 218-2. The portions of the plates 218-1 and 218-2 shown in the figure include holes 219-1 and 219-2, respectively. The positions of the holes 219-1 and 219-2 are selected to provide a particular imaging angle for the camera element 214, such that light arriving in the direction of the imaging angle is incident on the photosensor 217 as shown. It should be appreciated that different camera elements may have different imaging angles associated therewith.

In other possible implementations, the camera elements 214 may each include a corresponding microlens system for directing the light onto an associated image sensor. As another example, the camera elements 214 and display elements 212 may be constructed in the form of a combined element incorporating a semi-transparent tilt-mirror, an LCD display element, and an image sensor element. Such an arrangement eliminates the need for the above-noted collimated plates, but introduces additional complexity. Numerous other techniques for implementation of the combined display-camera will be apparent to those skilled in the art.

It is important when implementing the combined display-camera that sufficient light be provided for the image sensors of the camera elements. The above-noted microlens systems may be used for this purpose, although any shadows produced in the display by the use of such systems should be minimized. It is also important to provide some type of aperture control so as to allow the image sensors of the camera elements to operate in different lighting conditions. As one possible alternative, the system could be restricted to use under specified lighting conditions.

Advantageously, the arrangement of the alternating display elements 212 and camera elements 214 in the combined display-camera 210 allows perfect eye contact between images of on-site and remote users, since the camera elements are located in substantially the same plane as the display elements. In addition, the combined display-camera 210 reduces the required physical depth of the image processing system 200, which is particularly important in certain applications, such as the above-noted portable video conferencing and human-machine interface applications. Furthermore, the combined display-camera substantially eliminates the previously-described "fish eye" distortion problem resulting from use of a single wide angle camera to image users or other objects which are close to the display. Images generated by the combined display-camera 210 are well suited for use with motion algorithms such as background subtraction, motion field estimation, finger pointing detection, head tracking, etc.

Figure 5:
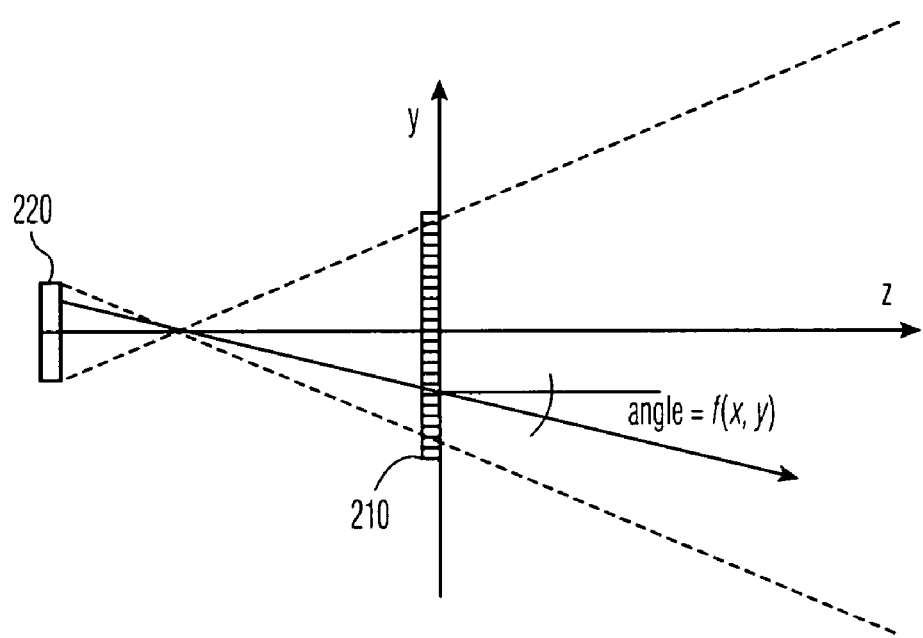
FIGS. 5 and 6 illustrate in greater detail the operation of the combined display-camera of FIG. 2.

FIG. 5 is a diagram illustrating the manner in which the combined display-camera 210 of FIG. 2 can approximate the imaging performance of a lens-based single-camera system. As shown, the combined display-camera can approximate the single-camera system by setting the imaging angles of each individual camera element in the combined display-camera. In this figure, the angle of a given camera element is specified as a function f(x,y) which when utilized in conjunction with similar setting of the other camera elements can produce an image at the plane of an imaging element 220 in a manner similar to a single-camera system. It should be understood that the element 220 is not an actual element of the image processing system, but is instead shown only to illustrate an effective imaging operation provided by the combined action of setting imaging angles for the individual camera elements.

Figure 6:
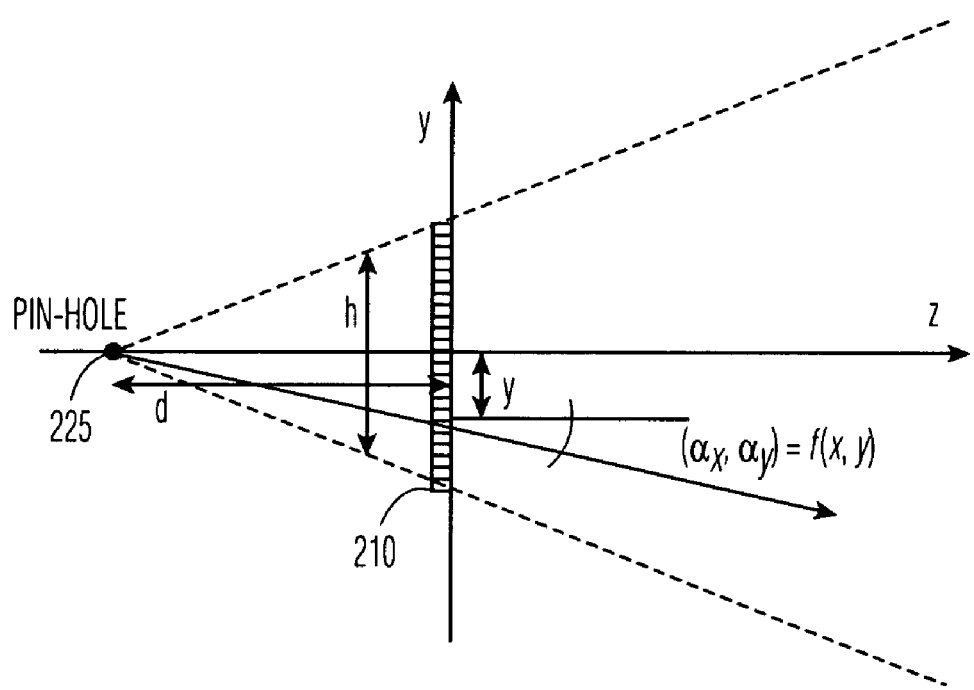

FIG. 6 is a diagram similar to that of FIG. 5 but illustrating the manner in which the imaging angles of the individual camera elements can be selected to approximate the imaging operation of a conventional pin-hole camera. In this example, each camera element is controlled with its own set of angles which includes one horizontal angle $\alpha_x$ and one vertical angle $\alpha_y$. These angles for a given one of the camera elements vary as a function f(x,y) of the corresponding horizontal distance x and vertical distance y between the given camera element and the optical axis of the combined display-camera 210. The above-noted functions for the set of camera elements are used to adjust the imaging characteristics of the combined display-camera 210. For example, the combined display-camera 210 can approximate a pin-hole camera using angles from $$\alpha_x = \tan^{-1}\left(\frac{x}{d}\right) \text{ and } \alpha_y = \tan^{-1}\left(\frac{y}{d}\right),$$

where d is the distance from the image plane to a virtual focus point at pin-hole 225.

The imaging angles of the camera elements 214 may be fixed or controllable. The term "selecting" as used herein is therefore intended to include selection of a fixed imaging angle for a given camera element, e.g., during design or manufacture of the combined display-camera, or controllable selection during set-up or operation of the combined display-camera, as well as other types of imaging angle selection. Controllable selection may be implemented at least in part under software control.

An alternative embodiment of the above-described combined display-camera 210 may associate more than a single image sensor with each of at least a subset of the camera elements. Such an embodiment would allow different imaging angles to be set for the different image sensors of a given camera element, such that different perspectives of a scene can be generated in the image processing system. In addition, motion algorithms may be applied to the images generated from the different image sensors in order to generate depth information.

Figure 7:
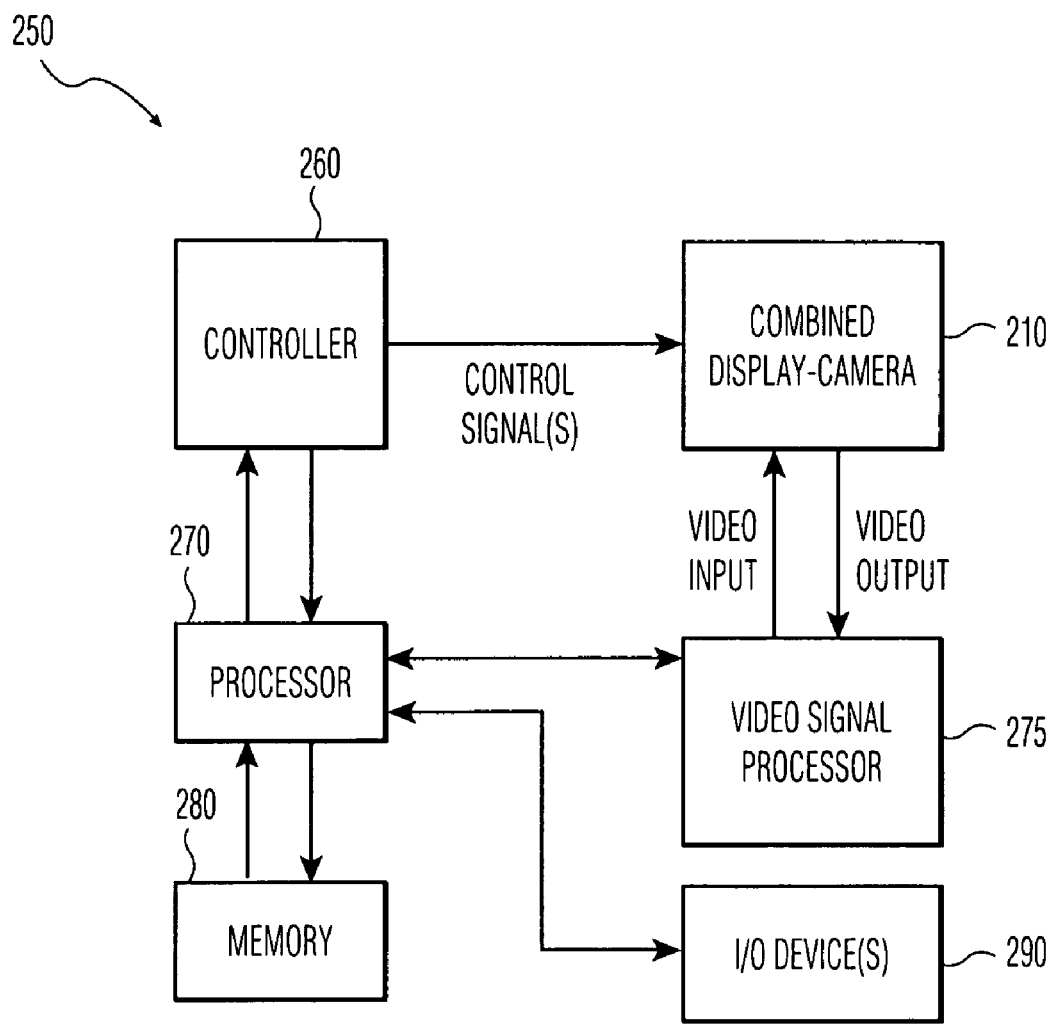
FIG. 7 shows an example of an image processing system in which the combined display-camera of FIG. 2 may be implemented.

FIG. 7 shows an example of an image processing system 250 which includes the above-described combined display-camera 210. The system 250 further includes a controller 260, a processor 270, a video signal processor 275, a memory 280, and one or more input/output (I/O) devices 290. In operation, the controller 260 controls the image angles of the camera elements of the combined display-camera 210 in order to provide a desired imaging operation in the manner previously described, as directed by the processor 270 using one or more software programs that may be stored in the memory 280. The video signal processor 275 also under the control of the processor 270 collects and processes video output information generated by the camera elements 214 of the combined display-camera 210, and delivers video input to the combined display-camera 210 for display to a user via the display elements 212. Video inputs and outputs of the system 250 may be communicated via the one or more I/O devices 290 in a conventional manner.

The system 250 may be adapted for use in any of a number of different image processing applications, including, e.g., video conferencing, video surveillance, human-machine interfaces, etc. More generally, the system 250 can be used in any application that can benefit from the use of the combined display-camera 210 of the present invention.

Elements or groups of elements of the system 250 may represent corresponding elements of an otherwise conventional desktop or portable computer, as well as portions or combinations of these and other processing devices. Moreover, in other embodiments of the invention, some or all of the functions of the controller 260, processor 270, video signal processor 275, memory 280 and/or other elements of the system 250 may be combined into a single device. For example, one or more of the elements of system 250 may be implemented as an application specific integrated circuit (ASIC) or circuit card to be incorporated into a computer, television, set-top box or other processing device.

The term "processor" as used herein is intended to include a microprocessor, central processing unit (CPU), microcontroller, digital signal processor (DSP) or any other data processing element that may be utilized in a given image processing system. In addition, it should be noted that the memory 280 may represent an electronic memory, an optical or magnetic disk-based memory, a tape-based memory, as well as combinations or portions of these and other types of storage devices.

The above-described embodiments of the invention are intended to be illustrative only. For example, the invention can be implemented using other types and arrangements of display elements and camera elements. The invention can be used in a wide variety of image processing systems, including video conferencing systems, video surveillance systems, and other camera-based systems. The invention can also be implemented at least in part in the form of one or more software programs which are stored on an electronic, magnetic or optical storage medium and executed by a processing device, e.g., by the processor 270 of system 250. These and numerous other embodiments within the scope of the following claims will be apparent to those skilled in the art.

What is claimed is:

1. An apparatus for use in an image processing system, the apparatus comprising:
a combined display-camera having a plurality of display elements and a plurality of camera elements, the display elements and camera elements comprising respective elements that are arranged substantially in a common plane with the display elements being interspersed with the camera elements, and wherein each of at least a subset of the camera elements has two or more imaging angles associated therewith, the two or more imaging angles being selected to provide a desired imaging operation for the combined display-camera.

2. The apparatus of claim 1 wherein at least a subset of the display elements comprise liquid crystal display elements.

3. The apparatus of claim 1 wherein at least a subset of the camera elements comprise charge-coupled device image sensors.

4. The apparatus of claim 1 wherein at least a subset of the camera elements comprise photosensors.

5. The apparatus of claim 1 wherein a given one of the camera elements comprises at least a portion of a pair of collimated plates, and wherein an imaging angle is selected for the given camera element by establishing a corresponding positioning of holes in the collimated plates.

6. The apparatus of claim 1 wherein the combined display-camera comprises a flat panel display.

7. The apparatus of claim 1 wherein at least a subset of the plurality of display elements and at least a subset of the plurality of camera elements are arranged in an array which includes more display elements than camera elements.

8. The apparatus of claim 1 wherein the two or more imaging angles are selected to provide an imaging operation for the combined display-camera which approximates that of a lens-based single-camera system.

9. The apparatus of claim 1 wherein the two or more imaging angles are selected to provide an imaging operation for the combined display-camera which approximates that of a pin-hole camera system.

10. The apparatus of claim 1 wherein the two or more imaging angles for a given one of the camera elements comprises a set of angles including a horizontal angle $$\alpha_x = \tan^{-1}\left(\frac{x}{d}\right)$$

and a vertical angle $$\alpha_y = \tan^{-1}\left(\frac{y}{d}\right),$$

where x and y denote the horizontal and vertical distances from the camera element to the optical axis of the combined display-camera, and d is the distance from an image plane of the combined display-camera to a desired virtual focus point of the combined display-camera.

11. The apparatus of claim 1 wherein each of at least a subset of the camera elements has a plurality of image sensors associated therewith, such that different imaging angles can be set for the different image sensors of a given camera element, and different perspectives of a scene can be generated in the image processing system.

12. A method for use in an image processing system, the method comprising the steps of:

provided a combined display-camera having a plurality of display elements and a plurality of camera elements, the display elements and camera elements comprising respective elements that are arranged substantially in a common plane with the display elements being interspersed with the camera elements, and wherein each of at least a subset of the camera elements has two or more imaging angles associated therewith; and selecting from the two or more imaging angles to provide a desired imaging operation for the combined display-camera.

13. An article of manufacture comprising a storage medium for storing one or more programs for use in an image processing system, the image processing system including a combined display-camera having a plurality of display elements and a plurality of camera elements, the display elements and camera elements comprising respective elements that are arranged substantially in a common plane with the display elements being interspersed with the camera elements, and wherein each of at least a subset of the camera elements has two or more imaging angles associated therewith, wherein from the two or more programs when executed by a processor implement the step of selecting the one or more imaging angles to provide a desired imaging operation for the combined display-camera.

* * * * *